United States Patent
Sugiura et al.

(10) Patent No.: US 7,397,167 B2
(45) Date of Patent: Jul. 8, 2008

(54) ULTRASONIC WAVE GENERATING DEVICE

(75) Inventors: Makiko Sugiura, Hekinan (JP); Takahiko Yoshida, Okazaki (JP); Yasuyuki Okuda, Aichi-gun (JP); Ryonosuke Tera, Toyota (JP); Hiroshi Tanaka, Toyokawa (JP); Yuta Hasebe, Obu (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 11/602,258

(22) Filed: Nov. 21, 2006

(65) Prior Publication Data

US 2007/0176498 A1    Aug. 2, 2007

(30) Foreign Application Priority Data

Jan. 30, 2006    (JP)    ............................. 2006-020876

(51) Int. Cl.
*H01L 41/08* (2006.01)
*H04R 17/00* (2006.01)

(52) U.S. Cl. .................................. 310/334; 310/323.21

(58) Field of Classification Search ............ 310/323.21, 310/341; 73/514.34; 324/61.47, 61.78, 61.79
See application file for complete search history.

(56) References Cited

FOREIGN PATENT DOCUMENTS

| JP | A-11-300274 | 11/1999 |
| JP | A-2003-52690 | 2/2003 |
| JP | A-2005-201910 | 7/2005 |
| JP | 2005269745 A * | 9/2005 |
| JP | 2005291941 A * | 10/2005 |
| JP | 2007054831 A * | 3/2007 |

* cited by examiner

*Primary Examiner*—Jaydi A San Martin
(74) *Attorney, Agent, or Firm*—Posz Law Group, PLC

(57) ABSTRACT

An ultrasonic wave generating device includes a substrate, a heat insulation layer on the substrate, a membrane heating portion on the heat insulation layer, and a membrane oscillator on the heating portion. The heating portion is electrically driven with a predetermined period, and produces heat for thermally displacing a surface of the oscillator. The oscillator receives a temperature variation with the predetermined period from the heating portion, and oscillates so as to generate ultrasonic waves.

18 Claims, 6 Drawing Sheets

ULTRASONIC WAVE GENERATING DEVICE

CROSS REFERENCE TO RELATED APPLICATION

This application is based on Japanese Patent Application No. 2006-20876 filed on Jan. 30, 2006, the disclosure of which is incorporated herein by reference in its entirety.

BACKGROUND OF THE INVENTION

1. Field of the Invention

The present invention relates to a device for generating and sending ultrasonic waves.

2. Description of Related Art

An ultrasonic wave generating device is used for an ultrasonic sensor mounted to a vehicle, e.g., automobile. The sensor sends ultrasonic waves from the device to an object. The object reflects the waves, and a receiving element in the sensor receives the reflected waves. Thus, a position or a distance for the object around the automobile can be measured. Further, a two-dimensional shape or a three-dimensional shape of the object can be measured. That is, the ultrasonic sensor is used for a safe driving by monitoring surroundings of the automobile.

For example, an automatic parking supporting system using an ultrasonic sensor is practically used. In the system, a back-sonar is used for detecting a human or an obstacle existing in the back of an automobile. The ultrasonic sensor is mounted to a rear part of the automobile, and receives ultrasonic waves reflected by the human or the obstacle. Thus, a back side collision with the human or the obstacle can be reduced.

JP-A-11-300274 discloses an ultrasonic wave generating device used in an ultrasonic sensor. The device is formed by layering a heating membrane on a substrate through a heat insulation layer with a micro electro mechanical system (MEMS) technology. The heating membrane is electrically driven, and generates a temperature variation corresponding to a period of an ultrasonic wave in air layer on the membrane. Thus, the device can thermally generate ultrasonic waves.

However, when the device is mounted to an automobile in an exposed state, water drops or dusts may adhere onto a surface of the device. In this case, efficiency for generating ultrasonic waves may be decreased, or the device may not generate ultrasonic waves. Then, a distance to an object may not accurately be measured. Further, the device may be damaged by a load of an external force, e.g., a collision with a small stone.

By contrast, when a protecting portion for reducing the damage is disposed in front of the device through air space, ultrasonic waves may be attenuated, because an impedance difference between the air space and the protecting portion is large. In this case, ultrasonic waves may not be transmitted to a farther position. Thus, a mounting state of the device is limited.

SUMMARY OF THE INVENTION

In view of the foregoing and other problems, it is an object of the present invention to provide an ultrasonic wave generating device. According to the device, ultrasonic waves can be efficiently sent, and a mounting state of the device can be freely set.

According to an example of the present invention, an ultrasonic wave generating device includes a substrate, a heat insulation layer on the substrate, a membrane heating portion on the heat insulation layer, and a membrane oscillator on the heating portion. The heating portion is electrically driven with a predetermined period, and produces heat for thermally displacing a surface of the oscillator. The oscillator receives a temperature variation with the predetermined period, and oscillates so as to generate ultrasonic waves.

Accordingly, ultrasonic waves can be efficiently sent from the ultrasonic wave generating device, and a mounting state of the device can be freely set.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

First Embodiment

Figure 1A:
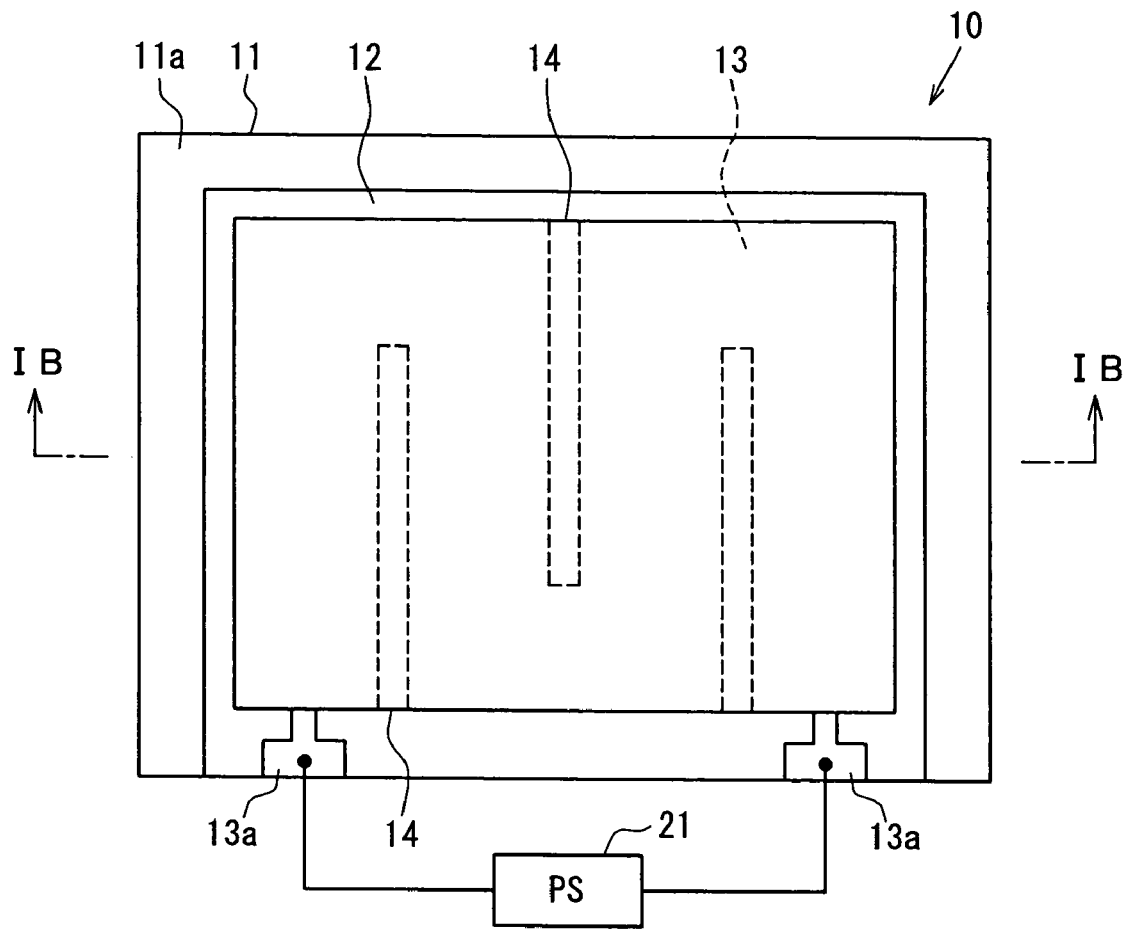
FIG. 1A is a schematic plan view showing an ultrasonic wave generating device according to a first embodiment of the present invention.
Figure 1B:
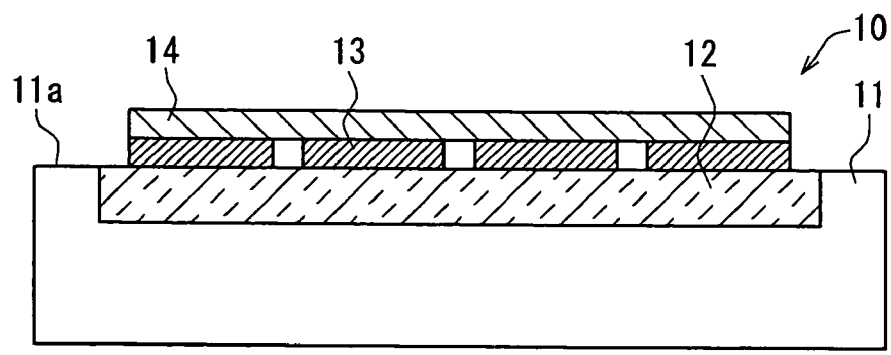
FIG. 1B is a schematic cross-sectional view taken along line 1B-1B in FIG. 1A.

An ultrasonic wave generating device 10 is mounted to an automobile, and used in an obstacle detecting sensor in a first embodiment. As shown in FIGS. 1A and 1B, the device 10 is provided with a quadrangular substrate 11 made of silicon. A quadrangular heat insulation layer 12 made of porous silicon is formed in the substrate 11, and forms a part of a substrate face 11a of the substrate 11. The layer 12 is formed by electrochemically etching the substrate 11 from the substrate face 11a.

A heating portion 13 is formed on the layer 12 by layering a membrane made of tungsten. As shown in FIG. 1A, the heating portion 13 is formed into a zigzag on a quadrangular area of the layer 12 by a membrane process such as plating or sputtering. The heating portion 13 has electrode pads 13a protruded from an end of the heating portion 13, and the pads 13a are electrically connected to a power source (PS) 21 for driving and operating the heating portion 13. An oscillator 14 is formed on the heating portion 13 except for the pads 13a.

Figure 2:
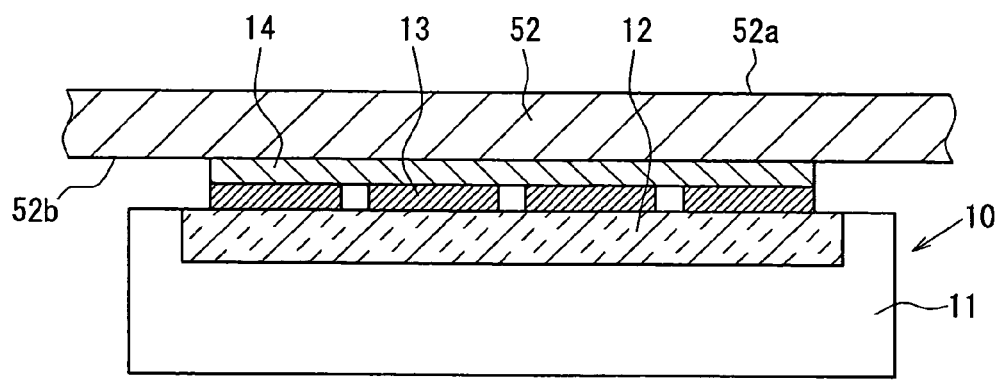
FIG. 2 is a schematic cross-sectional view showing the device mounted to an automobile.

The oscillator 14 is formed by a membrane process such as plating or sputtering. Alternatively, the oscillator 14 may be formed by fixing a foil portion, e.g., aluminum foil, on the heating portion 13. An upper part of FIG. 2 represents an outside of the automobile. As shown in FIG. 2, the oscillator 14 is in contact with a bumper 52. That is, the device 10 is mounted to an inner face 52b of the bumper 52 so as not to be exposed to an outside of the automobile.

The power source 21 supplies the heating portion 13 with electricity. A period of the electricity corresponds to a period of an ultrasonic wave. Thereby, when the heating portion 13 is driven, a heating value produced by the heating portion 13 periodically varies in accordance with a frequency of the electricity. The periodic heat produced by the heating portion 13 is transmitted to the oscillator 14, and a temperature of the oscillator 14 periodically varies. The oscillator 14 periodically repeats a thermal expansion and contraction in a thickness direction in accordance with the temperature variation. Thus, the oscillator 14 oscillates with a frequency corresponding to the frequency of the electricity applied to the heating portion 13. That is, an oscillating face of the oscillator 14 oscillates in accordance with the frequency of the applied electricity, and ultrasonic waves are generated from the oscillating face due to the oscillation.

The ultrasonic waves are transmitted from the inner face 52b to an outer face 52a through the bumper 52, because the oscillating face is in contact with the inner face 52b of the bumper 52. Then, the ultrasonic waves are sent from the outer face 52a toward an outside. The ultrasonic waves are reflected by an obstacle around the automobile, and the reflected waves are received by a receiving element (not shown) in the obstacle detecting sensor. An electric control unit (ECU) in the automobile performs a predetermined calculation based on a signal output from the receiving element. For example, a time difference and a phase difference between an ultrasonic wave sent from the ultrasonic wave generating device 10 and an ultrasonic wave received by the receiving element are calculated. Thus, the obstacle detecting sensor can measure a distance and a position for the obstacle based on the differences. Accordingly, the device 10 can be used as a source for sending ultrasonic waves in the obstacle detecting sensor.

Heat transmission from the heating portion 13 to the substrate 11 can be reduced, because the heat insulation layer 12 is disposed between the heating portion 13 and the substrate 11, as shown in FIG. 1B. That is, heat produced by the heating portion 13 is easily transmitted to the oscillator 14. Therefore, a response of the temperature variation of the oscillator 14 to the frequency of the electricity can be improved. Further, the temperature variation of the oscillator 14 can be increased, because heat dissipation from the heating portion 13 to the substrate 11 is reduced. Accordingly, an acoustic pressure of an ultrasonic wave can be increased, because amplitude of the oscillator 14 is enlarged.

Moreover, in order to have a larger amplitude, the oscillator 14 may have a large thermal expansion coefficient, e.g., equal to or more than 10 ppm/K, and a small thermal capacity. Further, although the oscillator 14 in use is heated and has a high temperature, a temperature of the oscillator 14 is equal to or less than a melting point or a glass transition point. Therefore, the oscillator 14 may be made of aluminum, glass, polyimide, silicon rubber or polycarbonate.

Especially, when the oscillator 14 is made of a metal membrane, which is mainly made of aluminum, thermal conduction by the oscillator 14 is better. Therefore, the device 10 can stably generate ultrasonic waves, because a response of the oscillator 14 to heat produced by the heating portion 13 is better. Further, weather-resistance performance of the oscillator 14 can be better. Even when water drops or dusts adhere onto the oscillator 14, the oscillator 14 does not deteriorate by corrosion. Therefore, the device 10 can be used in a case in which better weather-resistance performance is required. For example, the device 10 can be mounted to an automobile, and used in an exposed state.

For example, the device 10 is constructed with the substrate 11 made of silicon with a thickness of 400 μm, the heat insulation layer 12 made of porous silicon with a thickness of 30 μm, the heating portion 13 made of a tungsten membrane with a thickness of 30 nm and the oscillator 14 made of a square aluminum with a side length of 5 mm and a thickness of 0.5 mm. In this case, when energy of 800 W is input into the heating portion 13, the oscillating face of the oscillator 14 can have amplitude of about 4 μm.

As another example of the first embodiment, the substrate 11 may be made of ceramics, glass or metal such as aluminum, other than silicon. The heat insulation layer 12 may be made of other material having a low thermal conduction. For example, porous metal, e.g., porous aluminum, or polymeric materials may be used for forming the heat insulation layer 12. In a case in which the heat insulation layer 12 is made of a metal material, the layer 12 is electrically insulated from the heating portion 13. For example, a surface of the layer 12 may be oxidized, or an electrical insulation layer may be disposed on a surface of the layer 12. The heating portion 13 may be an electrical resistor made of aluminum, which generates a Joule heat, or constructed with a Peltier element.

Figure 3:
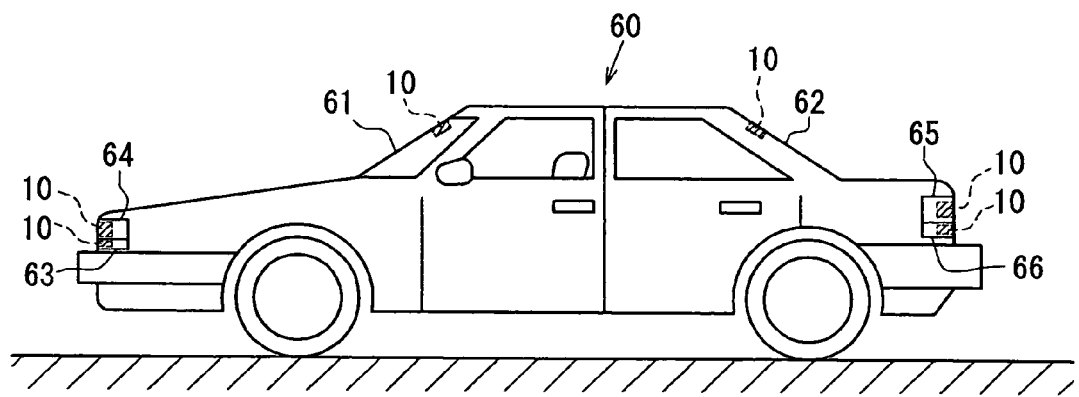
FIG. 3 is a diagram showing positions for mounting plural devices to an automobile.

As shown in FIG. 3, the ultrasonic wave generating device 10 may be mounted to a front glass 61 or a rear glass 62 of an automobile 60. This case is effective, when the device 10 is used in an ultrasonic sensor for detecting an obstacle in a back-and-forth direction of the automobile 60. Further, the device 10 may be mounted to a cover of a light-emitting portion on outer face of the automobile 60, based on a usage of an ultrasonic sensor. For example, when the device 10 is used in an obstacle detecting sensor on a side face of the automobile 60, the device 10 may be mounted to a cover of a winker 63. Further, the device 10 may be mounted to a cover of a head light 64, a rear light 65 or a back light 66 of the automobile 60, for example.

According to the first embodiment, the heating portion 13 supplies the oscillator 14 with a temperature variation having a predetermined period. Thereby, the oscillator 14 oscillates by repeating an expansion and contraction in accordance with the temperature variation. Thus, the device 10 generates and sends ultrasonic waves by oscillations of a solid member. Therefore, even when water drops or dusts adhere onto the oscillating face of the oscillator 14, efficiency for generating ultrasonic waves is not reduced. This is because ultrasonic waves are generated by oscillations of the oscillating face of the oscillator 14, not by oscillations of air layer. Accordingly, the device 10 can be mounted to an automobile in an exposed state. That is, the device 10 can efficiently send ultrasonic waves, and have a high flexibility for its mounting state.

The device 10 may be mounted to the bumper 52. In this case, the device 10 can be used in an ultrasonic sensor for detecting an obstacle or a human around the automobile. Further, the oscillator 14 is difficult to be damaged by a collision with a small stone in a driving time, because the device 10 is not exposed to an outside. Furthermore, when raindrops or dusts adhere onto the automobile, the raindrops or the dusts do not adhere onto the oscillator 14. Therefore, the device 10 can accurately operate. Moreover, a looking of the automobile can be kept better, because the device 10 is not exposed to an outside.

Second Embodiment

Figure 4:
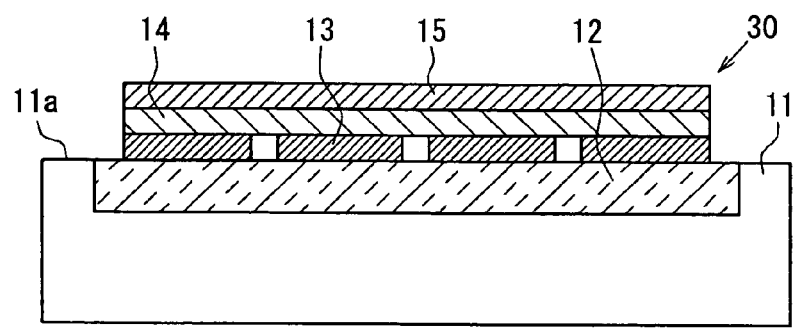
FIG. 4 is a schematic cross-sectional view showing an ultrasonic wave generating device according to a second embodiment.

As shown in FIG. 4, an ultrasonic wave generating device 30 in a second embodiment further includes a weight 15 on an oscillator 14. The weight 15 protects the oscillator 14 and amplifies amplitude of the oscillator 14. The weight 15 is made of a stainless board, and covers an oscillating face of the oscillator 14. A heating portion 13 is driven by electricity from the power source 21 (see FIG. 1A), and a period of the electricity varies in accordance with a period of an ultrasonic wave. Then, the oscillator 14 oscillates, and the weight 15 is displaced in accordance with a frequency of the oscillation. Thereby, a surface of the weight 15 oscillates so as to generate ultrasonic waves. At this time, amplitude of the oscillator 14 is increased compared with a case in which the weight 15 is not disposed on the oscillator 14, because the weight 15 pulls the oscillator 14, and promotes a displacement of the oscillator 14 due to an increased inertia of the oscillation. Thus, efficiency for generating ultrasonic waves can be increased, because the displacement of the surface of the weight 15 is enlarged.

Here, a sufficient inertia by the weight 15 is required for increasing the amplitude of the oscillator 14. Therefore, the weight 15 is made of a high-density material having a predetermined weight. Further, as described below, when the weight 15 is exposed to an outside of an automobile, the weight 15 is exposed to an outside air, and the oscillator 14 is required to be protected from a load of an external force. Therefore, the weight 15 is made of a weather-resistant robust material. Based on the above reasons, a material for forming the weight 15 has a high density, a high hardness and a high weather-resistant performance. For example, ceramics, rubber or metal, e.g., stainless or aluminum alloy, may be used for forming the weight 15.

Figure 5:
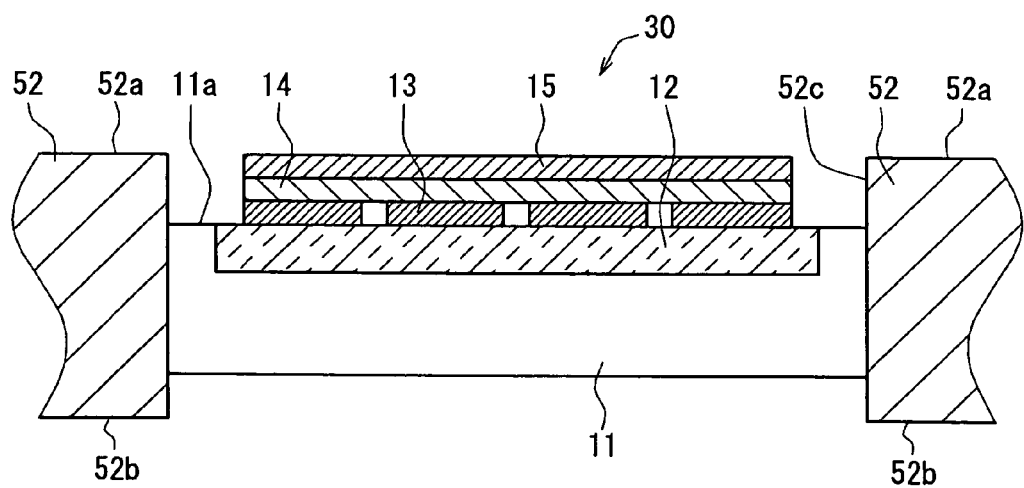
FIG. 5 is a schematic cross-sectional view showing a mounting state of the device shown in FIG. 4.

The device 30 may be mounted to an automobile such that the weight 15 is in contact with the inner face 52b of the bumper 52, similarly to the first embodiment. Alternatively, as shown in FIG. 5, an aperture part 52c may be formed in the bumper 52, and the device 30 may be mounted to the aperture part 52c such that the weight 15 is exposed to an outside of the automobile. In this case, water drops or dusts are difficult to adhere onto the oscillator 14, and the oscillator 14 is difficult to be damaged by a load of an external force, e.g., a collision with a small stone, because the oscillator 14 is covered with the weight 15. Thereby, the device 30 can be freely mounted, because the device 30 can be used with its surface exposed to an outside of the automobile.

Figure 6A:
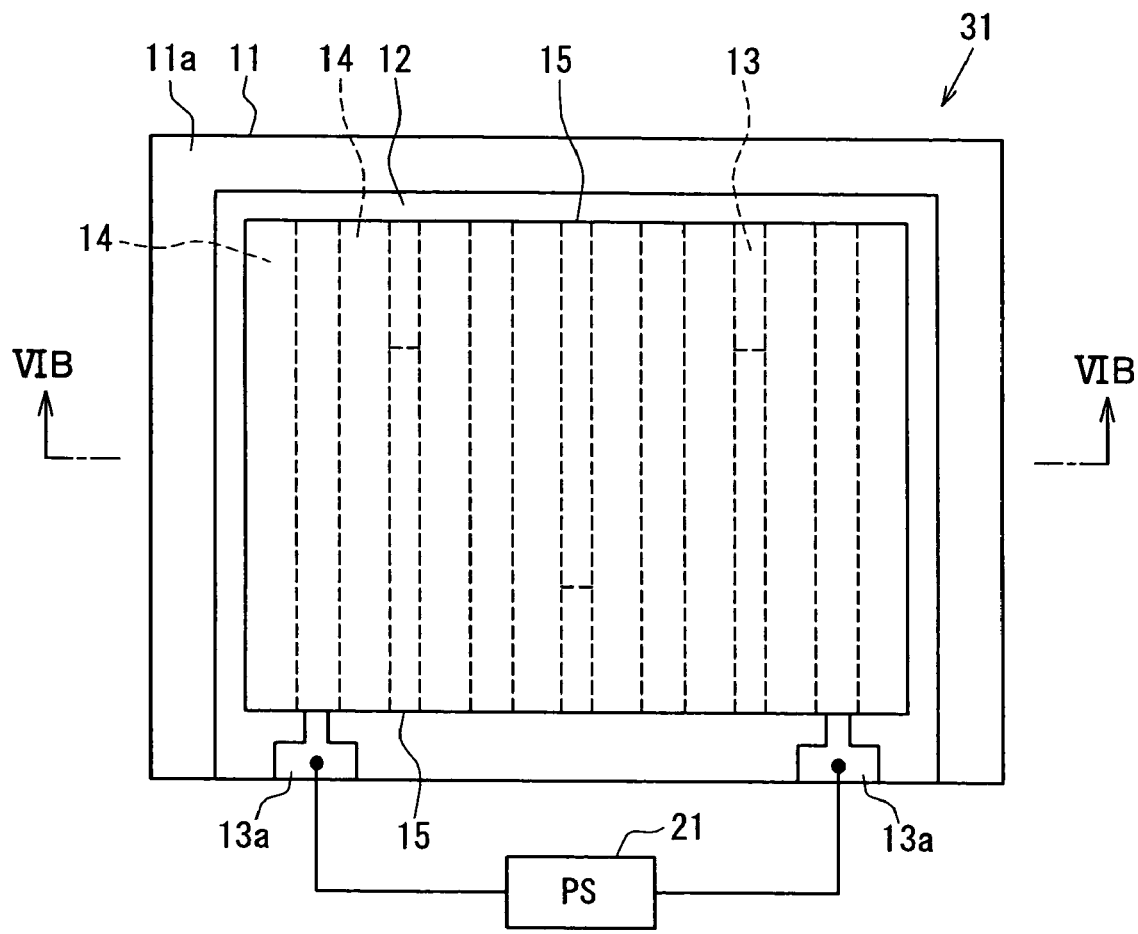
FIG. 6A is a schematic plan view showing an ultrasonic wave generating device according to another example of the second embodiment.
Figure 6B:
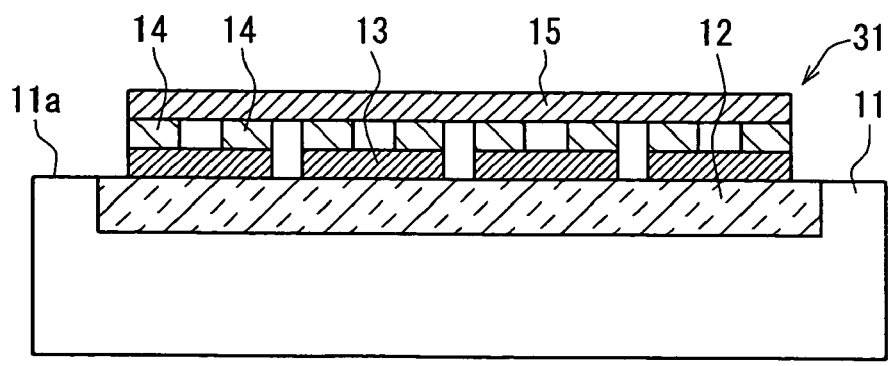
FIG. 6B is a schematic cross-sectional view taken along line VIB-VIB in FIG. 6A.

As another example of the second embodiment, the oscillator 14 may be formed on a part of the heating portion 13. As shown in FIGS. 6A and 6B, multiple band-shaped oscillators 14 may be disposed on the heating portion 13 with a predetermined clearance in an ultrasonic wave generating device 31. In this case, heat can be easily radiated from a part of the heating portion 13, on which the oscillator 14 is not formed. Therefore, ultrasonic waves can be stably generated, because a response of the oscillator 14 to heat produced by the heating portion 13 becomes better.

Figure 7A:
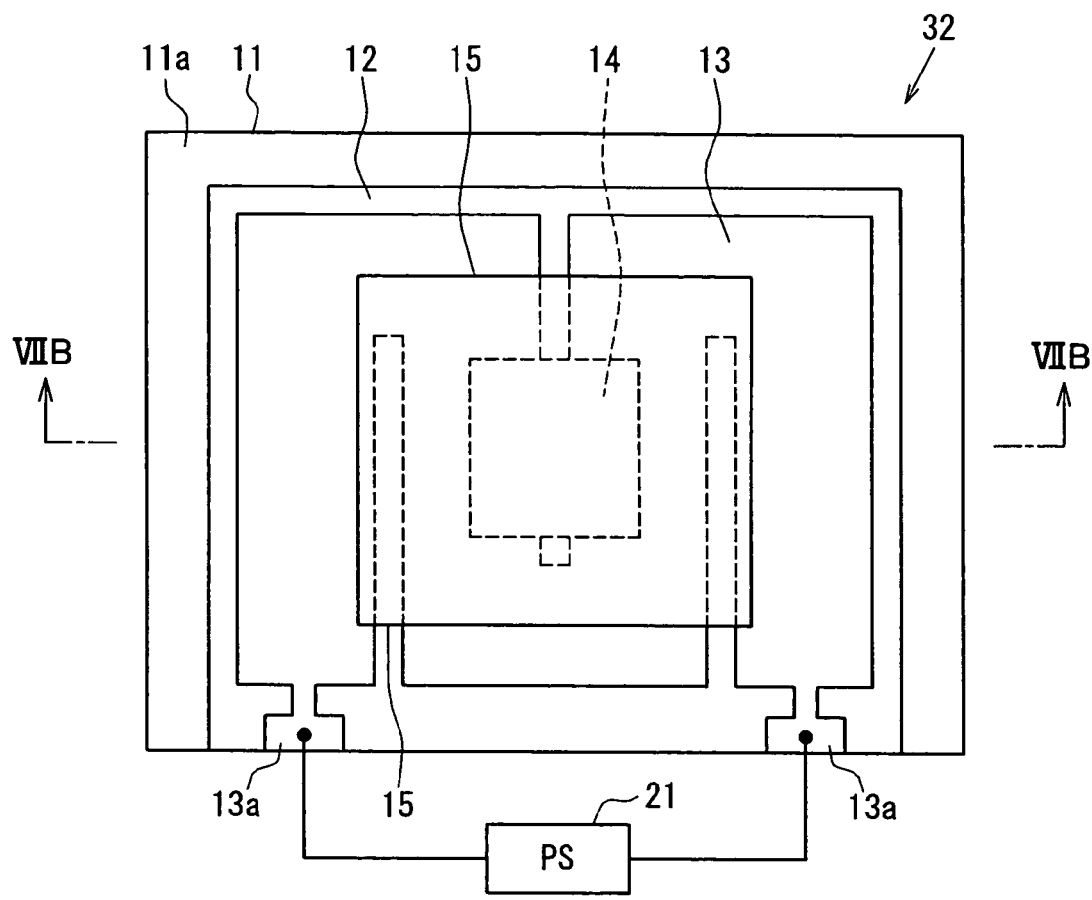
FIG. 7A is a schematic plan view showing an ultrasonic wave generating device according to another example of the second embodiment.
Figure 7B:
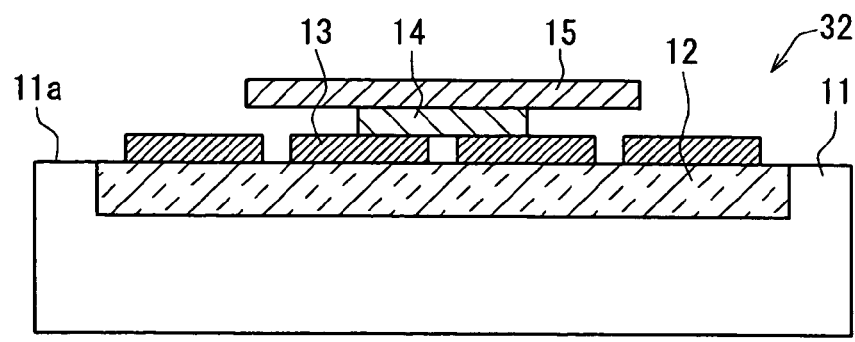
FIG. 7B is a schematic cross-sectional view taken along line VIIB-VIIB in FIG. 7A.

As shown in FIGS. 7A and 7B, in an ultrasonic wave generating device 32, the oscillator 14 may be formed into a quadrangular shape, for example, smaller than the heating portion 13, and disposed at an approximately center part of the heating portion 13. The weight 15 may be formed into a quadrangular shape, for example, smaller than the heating portion 13, and disposed so as to cover the entire oscillating face of the oscillator 14. In this case, heat can be easily radiated from a part of the heating portion 13, on which the oscillator 14 is not formed. Therefore, ultrasonic waves can be stably generated, because a response of the oscillator 14 to heat produced by the heating portion 13 becomes better. Further, an oscillating area for generating ultrasonic waves can be increased, because an area of the weight 15 is larger than that of the oscillating face of the oscillator 14. Accordingly, an acoustic pressure of an ultrasonic wave can be increased.

According to the second embodiment, amplitude of the oscillator 14 can be increased, because inertia of the oscillation is increased by the weight 15. Therefore, efficiency for generating ultrasonic waves can be increased compared with a case in which the weight 15 is not disposed on the oscillator 14. Further, when the device 30 is exposed to an outside of the automobile, water drops or dusts are difficult to adhere onto the oscillator 14, and the oscillator 14 is difficult to be damaged by a load of an external force, e.g., a collision with a small stone.

Third Embodiment

Figure 8:
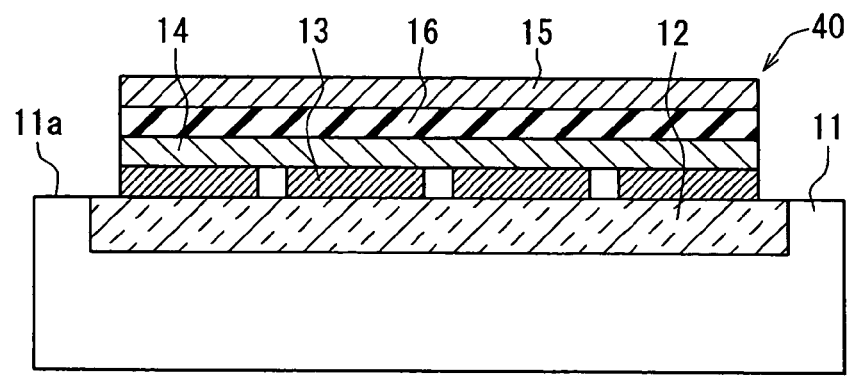
FIG. 8 is a schematic cross-sectional view showing an ultrasonic wave generating device according to a third embodiment.

As shown in FIG. 8, an ultrasonic wave generating device 40 in a third embodiment may further include an oscillation amplifying portion 16 having an elasticity between an oscillator 14 and a weight 15. The amplifying portion 16 is sandwiched between the oscillator 14 and the weight 15, and made of an elastic soft material, e.g., rubber or resin. A heating portion 13 is driven by electricity from a power source 21, and a period of the electricity varies in accordance with a period of an ultrasonic wave. Then, the oscillator 14 oscillates in accordance with a frequency of the electricity, and the weight 15 is displaced in a thickness direction. At this time, a displacement of a surface of the weight 15 is increased compared with a case in which the amplifying portion 16 is not disposed on the weight 15, because the amplifying portion 16 is transformed by an increased inertia of the oscillation of the weight 15. Thus, efficiency for generating ultrasonic waves can be increased, because the displacement of the surface of the weight 15 is enlarged.

Here, the amplifying portion 16 is made of an elastic and easily transformable material in order to make the displacement of the surface of the weight 15 to be large. For example, rubber or polymeric materials may be used for forming the amplifying portion 16.

The device 40 may be mounted to an automobile such that the weight 15 is in contact with the inner face 52b of the bumper 52, similarly to the second embodiment. Alternatively, an aperture part 52c may be formed in the bumper 52, and the device 40 may be mounted to the aperture part 52c such that the weight 15 is exposed to an outside of the automobile.

According to the third embodiment, oscillations of the oscillator 14 are amplified, because the amplifying portion 16 is transformed by the inertia of the oscillation of the weight 15. Accordingly, efficiency for generating ultrasonic waves can be more improved.

Other Embodiments

An oscillator 14 may be integrally formed with a heating portion 13 by using the same material. In this case, efficiency for transmitting heat produced by the heating portion 13 to the oscillator 14, and a response of the oscillator 14 to heat can be improved, because heat is directly transmitted from the heating portion 13 to the oscillator 14. Further, a process for forming the oscillator 14 can be reduced, if the heating portion 13 and the oscillator 14 are formed in the same process. Here, a heating value produced by the heating portion 13 may be decreased by an electricity leak from the heating portion 13 to the oscillator 14. In this case, the heating portion 13 and the oscillator 14 may be electrically insulated from each other. For example, an oxide film is formed on a surface of the heating portion 13 such that an electrical insulation layer is disposed between the oscillator 14 and the heating portion 13.

Figure 9:
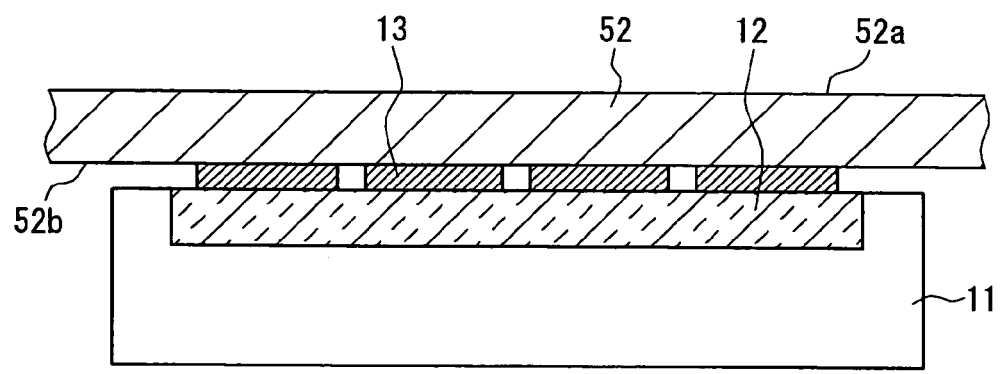
FIG. 9 is a schematic cross-sectional view showing an ultrasonic wave generating device according to a modified example of the present invention.

A portion for mounting the device 10 may be used as an oscillator. For example, as shown in FIG. 9, the heating portion 13 is in contact with the inner face 52*b* of the bumper 52 so as not to be exposed to an outside of an automobile. Thus, the bumper 52 may be used as the oscillator 14 of the above-described embodiments. In this case, a portion attenuating ultrasonic waves does not exist on an oscillating face of the oscillator 14, because the bumper 52 is used as the oscillator 14. Therefore, efficiency for generating ultrasonic waves can be improved. Further, a looking of the automobile can be kept better, because the device 10 is not exposed to an outside of the automobile. Furthermore, a glass portion, e.g., a front glass or a rear glass, may be used as the oscillator 14, and a cover of a headlight, a rear light, a winker or a back light may be used as the oscillator 14.

A receiving device for receiving ultrasonic waves may be formed on a substrate, on which the ultrasonic wave generating device 10 is formed, by a semiconductor integrated circuit technology. In this case, an ultrasonic sensor including the receiving element and the ultrasonic wave generating device 10 may be formed in compact and at a low cost.

Such changes and modifications are to be understood as being within the scope of the present invention as defined by the appended claims.

What is claimed is:

1. An ultrasonic wave generating device comprising:
a substrate;
a heat insulation layer on the substrate;
a membrane heating portion on the heat insulation layer; and
a membrane oscillator on the heating portions, wherein
the membrane oscillator covers the heating portion,
the heating portion is electrically driven with a predetermined period, and produces heat for thermally displacing a surface of the oscillator, and
the oscillator receives a temperature variation with the predetermined period from the heating portion, and oscillates so as to generate ultrasonic waves.

2. The ultrasonic wave generating device according to claim 1, further comprising a weight on the membrane oscillator, wherein the weight protects the membrane oscillator and increases an oscillation amplitude of the oscillator.

3. The ultrasonic wave generating device according to claim 2, further comprising an amplifying portion between the membrane oscillator and the weight, wherein the amplifying portion is elastic and amplifies the oscillation of the membrane oscillator.

4. The ultrasonic wave generating device according to claim 2, wherein the weight is mounted to a predetermined portion of an automobile so as to be exposed to an outside from the automobile.

5. The ultrasonic wave generating device according to claim 4, wherein the predetermined portion is a bumper of the automobile.

6. The ultrasonic wave generating device according to claim 4, wherein the predetermined portion is at least one of a front glass and a rear glass of the automobile.

7. The ultrasonic wave generating device according to claim 4, wherein the predetermined portion is a cover of a light emitting portion mounted to an outer face of the automobile.

8. The ultrasonic wave generating device according to claim 1, wherein the membrane oscillator has an oscillating face in contact with a predetermined portion of an automobile so as to be covered by the predetermined portion.

9. The ultrasonic wave generating device according to claim 8, wherein the predetermined portion is a bumper of the automobile.

10. The ultrasonic wave generating device according to claim 8, wherein the predetermined portion is at least one of a front glass and a rear glass of the automobile.

11. The ultrasonic wave generating device according to claim 8, wherein the predetermined portion is a cover of a light emitting portion mounted to an outer face of the automobile.

12. The ultrasonic wave generating device according to claim 8, wherein the membrane oscillator is a part of the predetermined portion.

13. The ultrasonic wave generating device according to claim 1, wherein the membrane oscillator is a metal membrane made of an aluminum-based material.

14. The ultrasonic wave generating device according to claim 1, wherein the membrane oscillator includes multiple bands with a predetermined clearance therebetween.

15. The ultrasonic wave generating device according to claim 1, wherein the membrane oscillator is made of a material that is different from that of the heating portion.

16. The ultrasonic wave generating device according to claim 1, wherein the heating portion has a plurality of heating elements that are separated from one another by spaces, and the membrane oscillator covers the plurality of heating elements and the spaces.

17. An ultrasonic wave generating device comprising:
a substrate;
a heat insulation layer on the substrate;
a membrane heating portion on the heat insulation layer; and
a membrane oscillator on the heating portion, wherein
the membrane oscillator covers at least part of the heating portion,
the heating portion is electrically driven with a predetermined period, and produces heat for thermally displacing a surface of the oscillator, and
the oscillator receives a temperature variation with the predetermined period from the heating portion, and oscillates to generate ultrasonic waves.

18. The ultrasonic wave generating device according to claim 17, wherein the weight has a larger area than the membrane oscillator to cover the entire surface of the membrane oscillator.

* * * * *